United States Patent [19]

Toldi et al.

[11] Patent Number: 4,722,012
[45] Date of Patent: Jan. 26, 1988

[54] DISC DRIVE ARRANGEMENT FOR A HARD DISC CARTRIDGE HAVING A CARRIAGE FOR ACCURATELY POSITIONING A HEAD RELATIVE TO THE CARTRIDGE

[75] Inventors: George Toldi, Santa Clara; Anil Nigam, Cupertino; Ronald Crain; Dominic Mercurio, both of San Jose, all of Calif.

[73] Assignee: SyQuest Technology, Fremont, Calif.

[21] Appl. No.: 47,038

[22] Filed: May 5, 1987

Related U.S. Application Data

[62] Division of Ser. No. 520,256, Aug. 4, 1983, Pat. No. 4,683,506.

[51] Int. Cl.[4] .................. G11B 5/54; G11B 21/22; G11B 5/012; G11B 5/016
[52] U.S. Cl. ...................... 360/97; 360/105; 360/106; 360/99
[58] Field of Search .................... 360/97–99, 360/105–107; 310/12, 15

[56] References Cited

U.S. PATENT DOCUMENTS

| | | | |
|---|---|---|---|
| 3,896,495 | 7/1975 | Beefcroft | 360/105 |
| 4,017,898 | 7/1977 | Toombs et al. | 360/105 |
| 4,206,489 | 6/1980 | Manzke et al. | 360/105 |
| 4,302,789 | 11/1981 | Vos | 360/105 |
| 4,308,564 | 12/1981 | Thompson | 360/99 |
| 4,310,864 | 1/1982 | Patel et al. | 360/97 |
| 4,368,495 | 1/1983 | Hammanuka et al. | 360/97 |
| 4,392,165 | 7/1983 | Wright | 360/105 |
| 4,396,963 | 8/1983 | Wright | 360/105 |
| 4,418,370 | 11/1983 | Harrison | 360/106 |
| 4,456,937 | 6/1984 | Iftikar et al. | 360/106 |
| 4,470,088 | 9/1984 | Fick | 360/105 |
| 4,471,396 | 9/1984 | Iftikar et al. | 360/106 |
| 4,480,281 | 10/1984 | Cartwell | 360/105 |
| 4,504,879 | 3/1985 | Toldi et al. | 360/105 |
| 4,683,506 | 7/1987 | Toldi et al. | 360/105 |

FOREIGN PATENT DOCUMENTS 57-205870 12/1982 Japan .................... 360/106

OTHER PUBLICATIONS

IBM Technical Discl. Bulletin, vol. 20, No. 6, Nov. 1977, pp. 2362-2363, "Head Retraction Latch Mechanism" by Hall, Jr. et al.

Primary Examiner—John H. Wolff
Assistant Examiner—Alfonso Garcia
Attorney, Agent, or Firm—Fliesler, Dubb, Meyer & Lovejoy

[57] ABSTRACT

A disc drive arrangement 10 for accessing information from and recording information onto a disc 25 to be retained in a cartridge 27 which comprises a carriage 24 for mounting and transporting the head 26, 28 accurately relative to the cartridge 27. The carriage 24 includes a base 100 upon which is mounted the head 26, 28 and cylindrical roller bearings 214, 216, 218, 220 and 222. The roller bearings 214, 216, 218, 220 and 222 roll on a plurality of hardened rods 228, 230 which are mounted on a track 102 which is affixed to the floor 16 of the disc drive 10. At least one of the roller bearings 214, 216, 218, 220 and 222, is resiliently mounted relative to the base 100 in order to evenly distribute the load placed by the base 100 on the track 102. Further any potential contaminants collecting on the rods are urged to one or the other side of the rods 228, 230 as the cylindrical rollers 214, 216, 218, 220, 222 roll on said rods thereby insuring accurate position of the head 26, 28.

2 Claims, 10 Drawing Figures

DISC DRIVE ARRANGEMENT FOR A HARD DISC CARTRIDGE HAVING A CARRIAGE FOR ACCURATELY POSITIONING A HEAD RELATIVE TO THE CARTRIDGE

This is a division of Ser. No. 06/520,256, now U.S. Pat. No. 4,683,506, filed 8/4/83.

TECHNICAL FIELD

The present invention relates to a disc drive arrangement for use with a computer for information storage and retrieval, and in particular to a disc drive arrangement which can accept a cartridge containing a hard disc.

BACKGROUND ART

Over the past several years the number and variety of disc drives which can store and retrieve information on hard (rigid) discs have increased many fold due to the increased use of computers and microprocessors to accomplish more tasks. There are several disadvantages with the prior art devices. These include the following.

First, in prior art disc drives, the placement of the recording heads relative to the disc is generally accomplished by a voice coil actuator. When there is power failure in the system, the voice coil actuator arrangement becomes inoperative. If there is sensitive information on the disc and the operator wishes to remove the disc, the procedure is generally to insert a screwdriver type object into a hole provided in the disc drive in order to release the voice coil actuator and remove the disc. Many times this does not work, with resultant damage to the recording heads or the loss of information from and damage to the disc, or both.

Another disadvantage of the prior art disc drives is that not enough attention is given to depositing the heads adjacent the disc in such a manner that the heads do disturb the surface of the disc.

A third disadvantage with prior art devices is that the cartridge and thus the disc contained therein may not be positionable with respect to the heads with the desired repeatability.

Still another disadvantage of prior art drives is that there is insufficient consideration given to thermal expansion of the various components of the disc drive which occurs as the disc drive is used. Accordingly, the head may not be accurately located or registered with respect to a track on the disc and thus information provided on that track may not be locatable.

Yet another disadvantage of prior art devices is that dust particles may become lodged in the moving parts, for example, the carriage which transports the head to and from the disc, thus interfering with the orderly and accurate positioning of the heads with respect to the disc.

The present invention is directed to overcoming one or more of the problems thus set forth above.

DISCLOSURE OF INVENTION

In one aspect of the invention a disc drive arrangement for accessing information from and recording information onto a hard disc retained in a cartridge, which cartridge is removably insertable into the disc drive, comprises a housing, a door, means for mounting the door to the housing, at least one head, and a carriage means for mounting and transporting the head. The disc drive arrangement further includes means for movably mounting said head to the carriage, means for movably mounting the carriage to the housing, motor means for positioning the carriage relative to the housing, and linkage means operatively connecting the door to the carriage for urging the carriage and head away from the cartridge when the door is open. The linkage means includes a linkage arrangement which is operatively connected to the door and a lever means for selectively engaging the carriage. The lever means has a cammed surface and is pivotally mounted in the housing so that, as the linkage arrangement is urged against the cammed surface as said door is opened, the lever means urges the carriage and head away from the cartridge.

In another aspect of the invention, the disc drive arrangement includes a spindle and means for receiving and driving the disc, said receiving means including means for urging the disc onto the spindle and then urging the cartridge housing away from the spindle as the door closes. The receiving means further includes spring means for contacting the cartridge in a plurality of locations so as to resiliently hold the cartridge in a predefined position relative to the receiving means.

In yet another aspect of the invention the disc drive arrangement includes means for balancing the thermal expansion of the housing, the disc and the carriage so that the head is accurately positionable with respect to the disc. The balancing means includes a first reference point from which the housing and the disc expand in one direction and a second reference point from which the carriage and the head expand toward the disc.

In another aspect of the invention, the disc drive arrangement further includes a carriage means including a track secured to the housing and a base, and roller means for interconnecting the base to the track. The roller means includes a plurality of cylindrical rollers mounted on at least one of said track and said base and wherein said cylindrical rollers ride on a plurality of rods mounted on at least the other of said track and base. This arrangement prevents the accumulation of and crushing of dirt and other contaminants between the roller and the rod as the contaminants tend to fall to one side or the other.

From the above it can be seen that the present invention solves the problems of the prior art in that it provides a disc drive arrangement wherein even during a power failure the head and the carriage on which the head is mounted is urged away from the disc and cartridge as the doors open so that the head does not interfere with any of the information stored on the disc, so that the head is not damaged as the cartridge is removed, and the cartridge can be safely and easily removed from the disc drive to protect any sensitive information which may be contained on the disc in the cartridge. Further, the present invention provides for the accurate, repeatable positioning of the cartridge and thus the disc with respect to the head by accounting for the thermal expansion of the various components of the disc drive and also by the accurate and repeatable positioning of the cartridge into a receiving means of the disc drive which causes the cartridge to be precisely and repeatably seated on the spindle. Further, the present invention is designed so that contaminants do not interfere with the operation of the carriage.

PREFERRED EMBODIMENT OF THE INVENTION

A disc drive arrangement is disclosed in U.S. Pat. No. 4,504,879 which was filed on June 4, 1982 and which is assigned to SyQuest Technology, the present assignee. This application is incorporated herein by reference.

Figure 1:
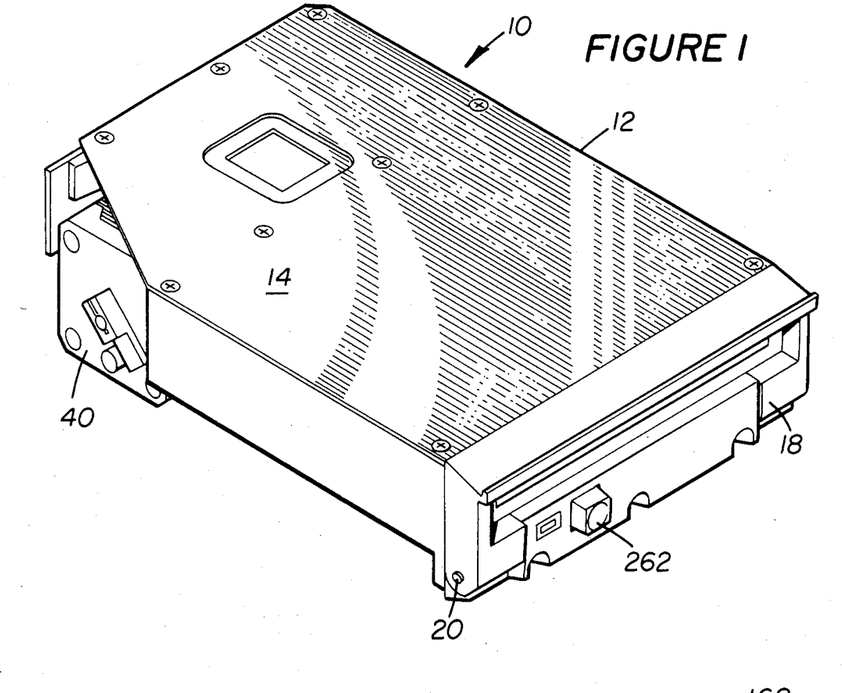
FIG. 1 is a perspective view of an embodiment of the disc drive arrangement of the invention.
Figure 2:
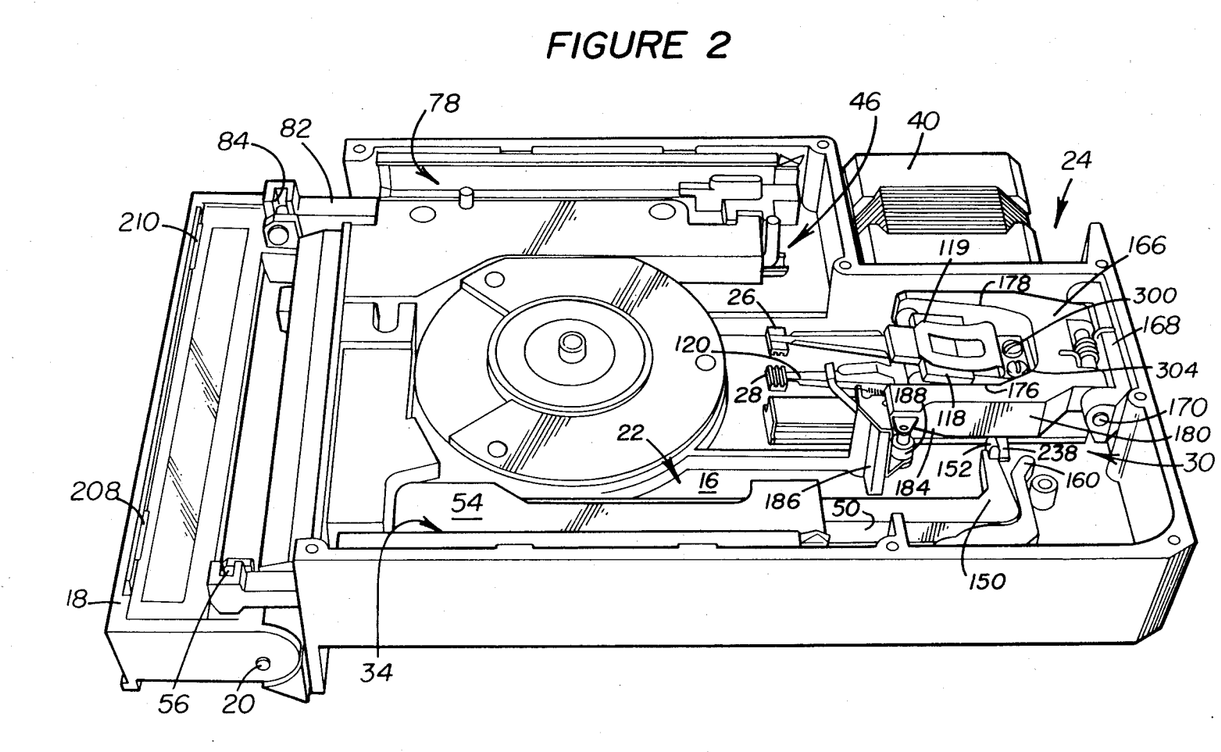
FIG. 2 is another perspective view of the disc drive arrangement of FIG. 1 with the door opened and the top thereof removed.

With reference to the figures and in particular to FIG. 1 an embodiment of the disc drive arrangement of the invention is depicted and denoted by numeral 10. Disc drive arrangement 10 includes a housing 12 having a cover 14 and a floor 16 (FIG. 2). It should be understood that the electronic and logic circuitry (not shown) is located below floor 16 or at the back of arrangement 10 and is the subject of a co-pending application. Housing 12 includes a door 18 which is pivotally secured thereto along pivotal axis 20.

Figure 7A:
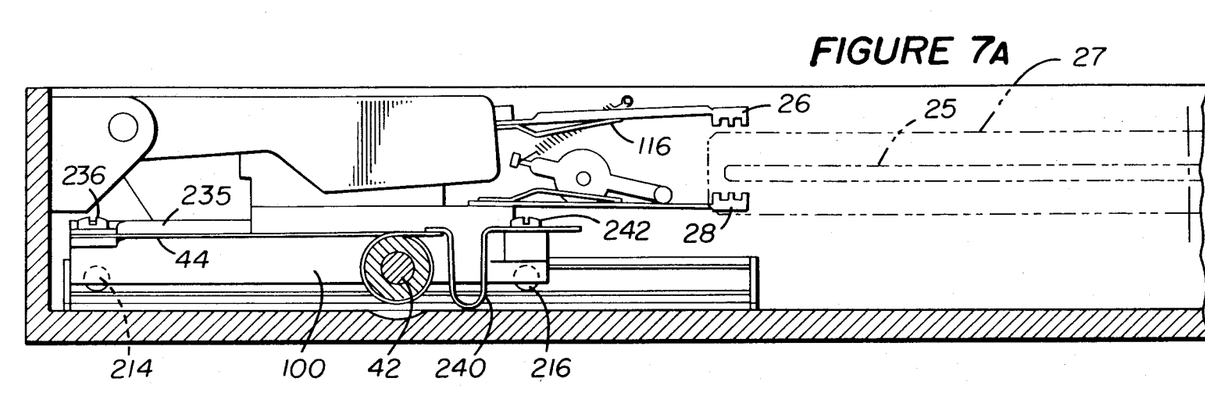
FIGS. 7A and 7B are cross-sectional views taken through line 7 in FIG. 3.
Figure 7B:
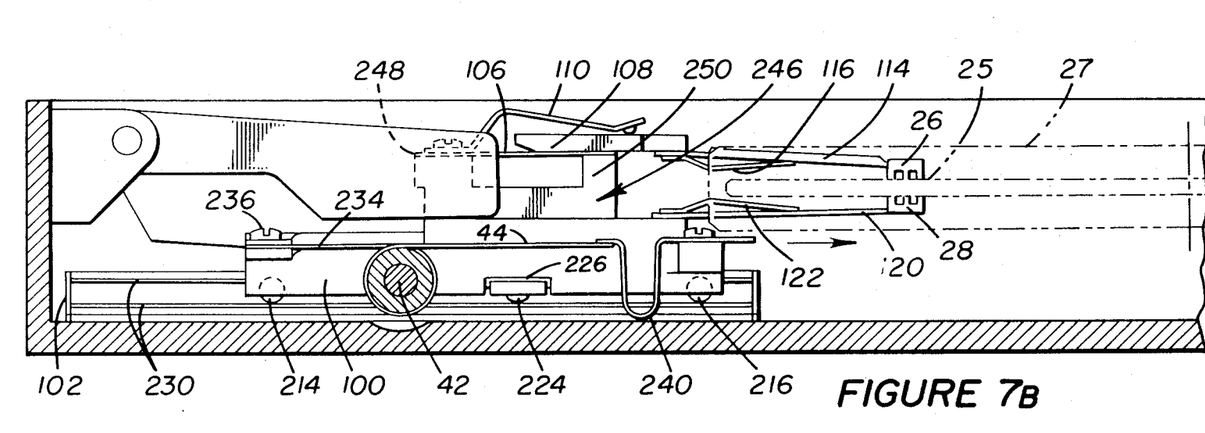

In FIG. 2 the cover 14 of the disc drive arrangement 10 has been removed and the door 18 has been pivoted to an open position. The disc drive arrangement 10 further includes a linkage means 22 for operatively connecting the door 18 to a carriage 24 which mounts upper and lower recording heads 26 and 28. It is to be understood that although heads 26 and 28 are referred to as recording heads, they can also read information stored on the disc. The linkage means 22 lifts the heads 26, 28 from the disc 25 and urges the carriage away from the disc drive cartridge 27, shown in phantom in FIGS. 7A, 7B, when the door is opened. The disc drive arrangement 10 further includes a cam arrangement 20. The disc drive arrangement 10 also includes cartridge mounting and positioning means 34 and 36 which are actuated when the door 18 is opened and closed.

Figure 3:
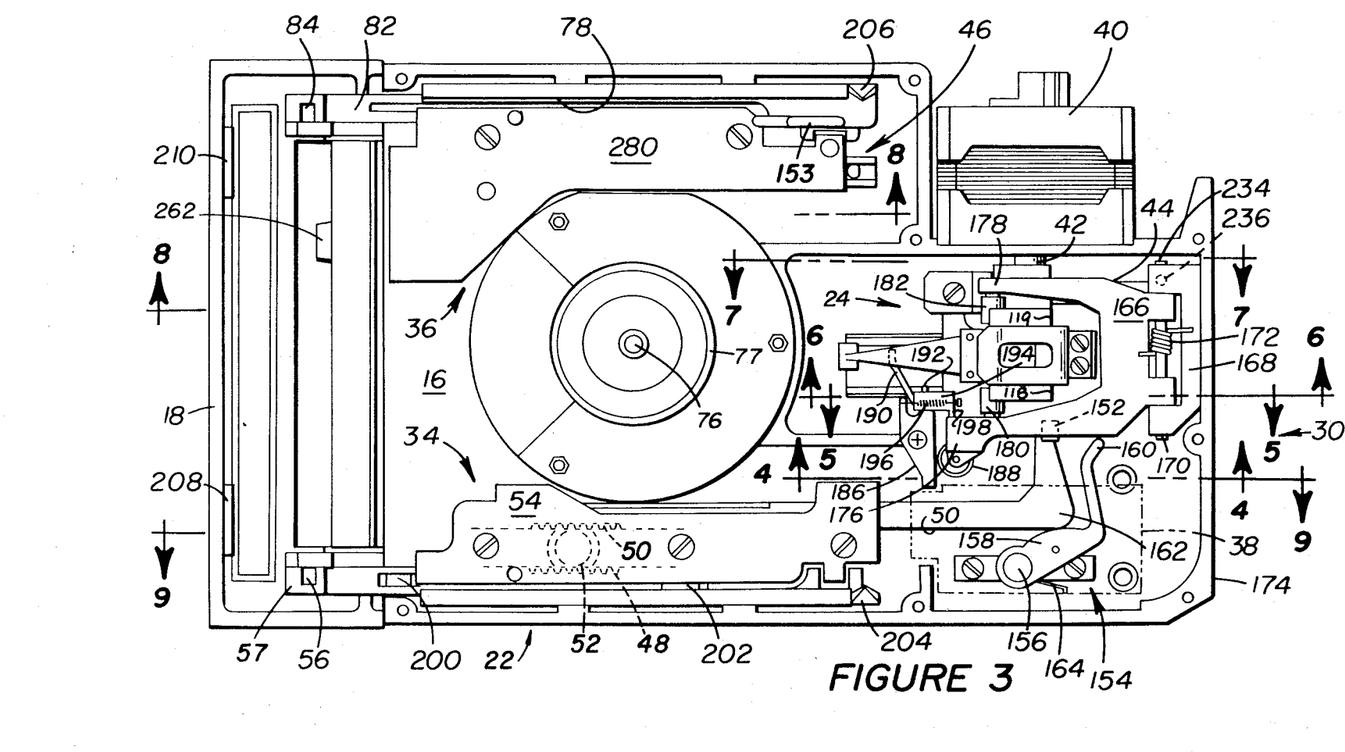
FIG. 3 is a plan view of the embodiment of FIG. 1 with the door opened and the top removed.
Figure 4:
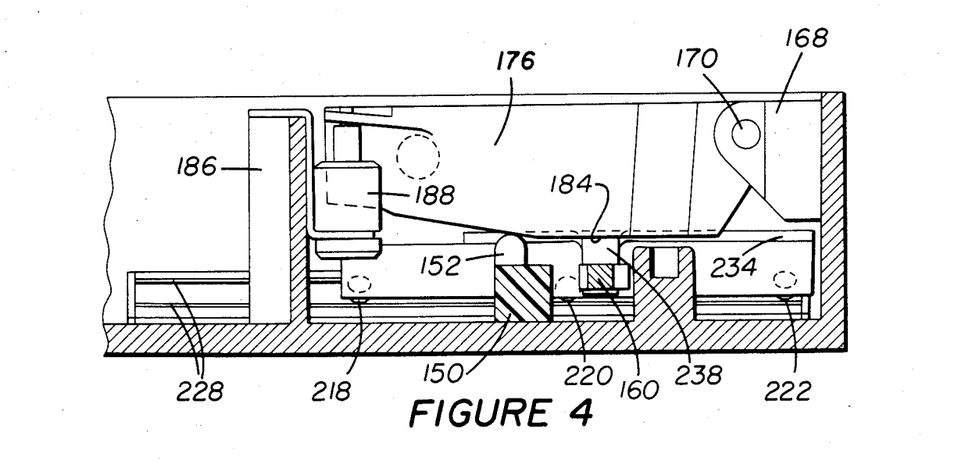
FIG. 4 is a cross-sectional view taken through line 4—4 in line FIG. 3.
Figure 5:
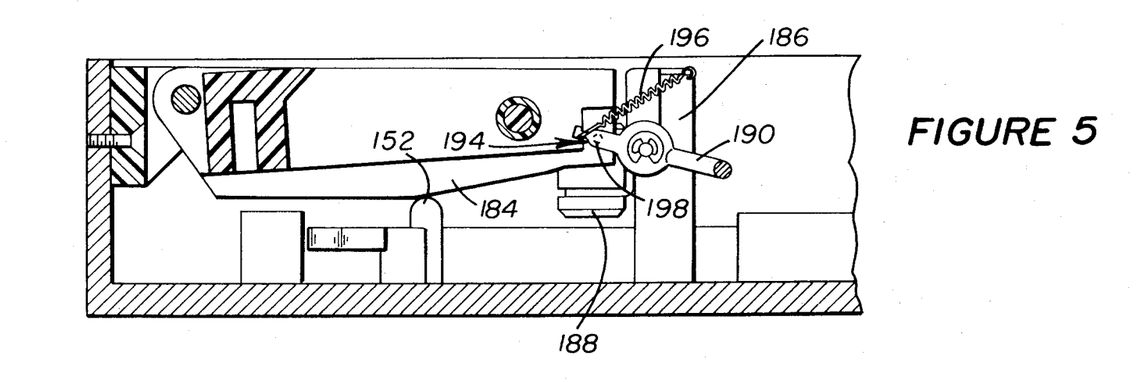
FIG. 5 is a cross-sectional view taken through line 5—5 in FIG. 3.

The disc drive arrangement 10 additionally includes an air filter 38, shown in phantom in FIG. 3, to remove contaminants from the inside of the housing 12. The arrangement 10 includes a stepper motor 40 which has a shaft 42. The shaft 42 is operatively connected to the carriage 24 by a band means 44. An ejector means 46 (FIGS. 2, 3) is mounted with the cartridge mounting and positioning means 36. A more detailed description of the above components of the disc drive arrangement 10 follows.

The cartridge mounting and positioning means 34 (FIG. 9) includes first and second racks 48 and 50 and pinion 52 which operatively connects first and second racks 48 and 50. First and second racks 48 and 50 and pinion 52 are provided in mount 54 which is secured to the floor 16 of the housing 12. Additionally first rack 48 includes a pin 56 which is mounted in a slot 57 defined by door 18. Pins 60 and 62 extend from first rack 48.

Figure 9:
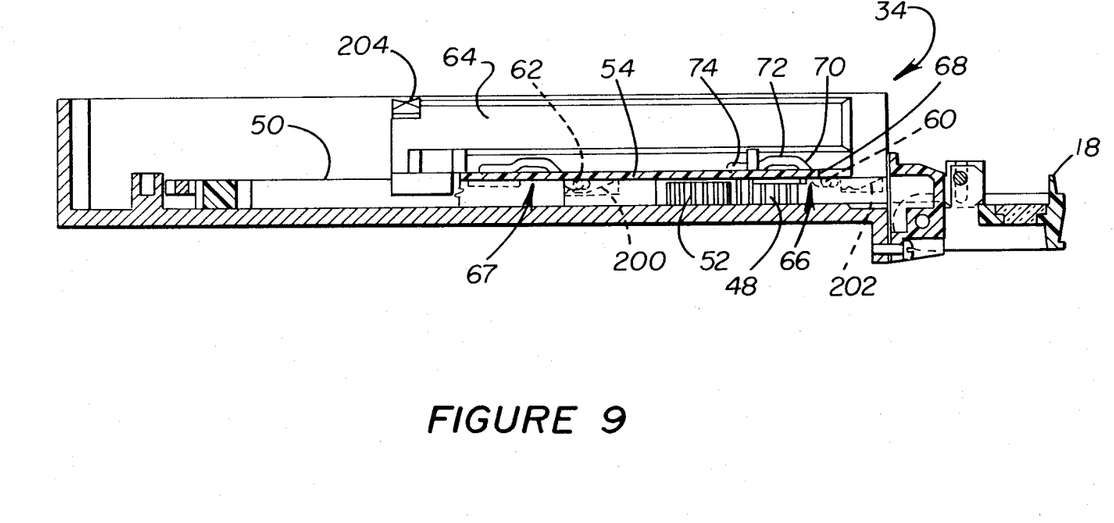
FIG. 9 is a cross-sectional view taken through line 9—9 in FIG. 3.

Cartridge mounting and positioning means 34 includes a longitudinal channel 64 which can accept an edge of the cartridge 27. Under channel 64 substantially Z-shaped slots 66, 67 are defined into which pins 60 and 62 are disposed. Z-shaped slot 66 includes a first substantially horizontal portion 68, a second ramped portion 70 which ends in a spiked portion 72 and a second substantially horizontal portion 74. Slot 67 is similar in configuration. Slots 66, 67 define a motion for the cartridge as the door 18 is closed and the cartridge is placed in the operative position. The spiked portion 72, as will be described more fully hereinbelow, is to insure that the cartridge is properly seated on the drive spindle 76 which extends through the floor 16. It is to be understood that cartridge mounting and positioning means 36 has a longitudinal channel similar to channel 64 and Z-shaped slots similar to slots 66, 67, the channel being identified by numeral 78. Further a longitudinal member 82 is slidingly pinned through a slot 84 of door 18.

It is to be understood that as the door 18 opens, rack 48 is pulled out of housing 12 toward door 18 and rack 50 is pushed away from door 18 further into housing 12. At the end of rack 50 is an arm 150 which is substantially parallel to floor 16 and perpendicular to second rack 50. Arm 150 engages the cam arrangement 30 as described hereinbelow.

Arm 150 includes an upstanding tab 152 which engages cam arrangement 30 to lift heads 26 and 28 from the upper and lower surfaces of the disc 25 respectively as will be described more fully hereinbelow. A second arm 154 is pivotally mounted to base 16 at pivot point 156. Arm 154 is substantially L-shaped and includes a cam surface 158 which is located adjacent pivot point 156 and a bent end 160 which is located distally from pivot point 156. The arm 154 is biased toward rack 50 by a torsion spring 164. Cam surface 158 is engaged by the end portion 162 of second rack 50 to urge arm 154 rearwardly as door 18 is opened. This action causes the carriage 24 to be urged rearwardly as will be explained hereinbelow in order to insure that the heads 26 and 28 are out of the way of the cartridge 27 as it is inserted into the disc drive arrangement 10.

Figure 8:
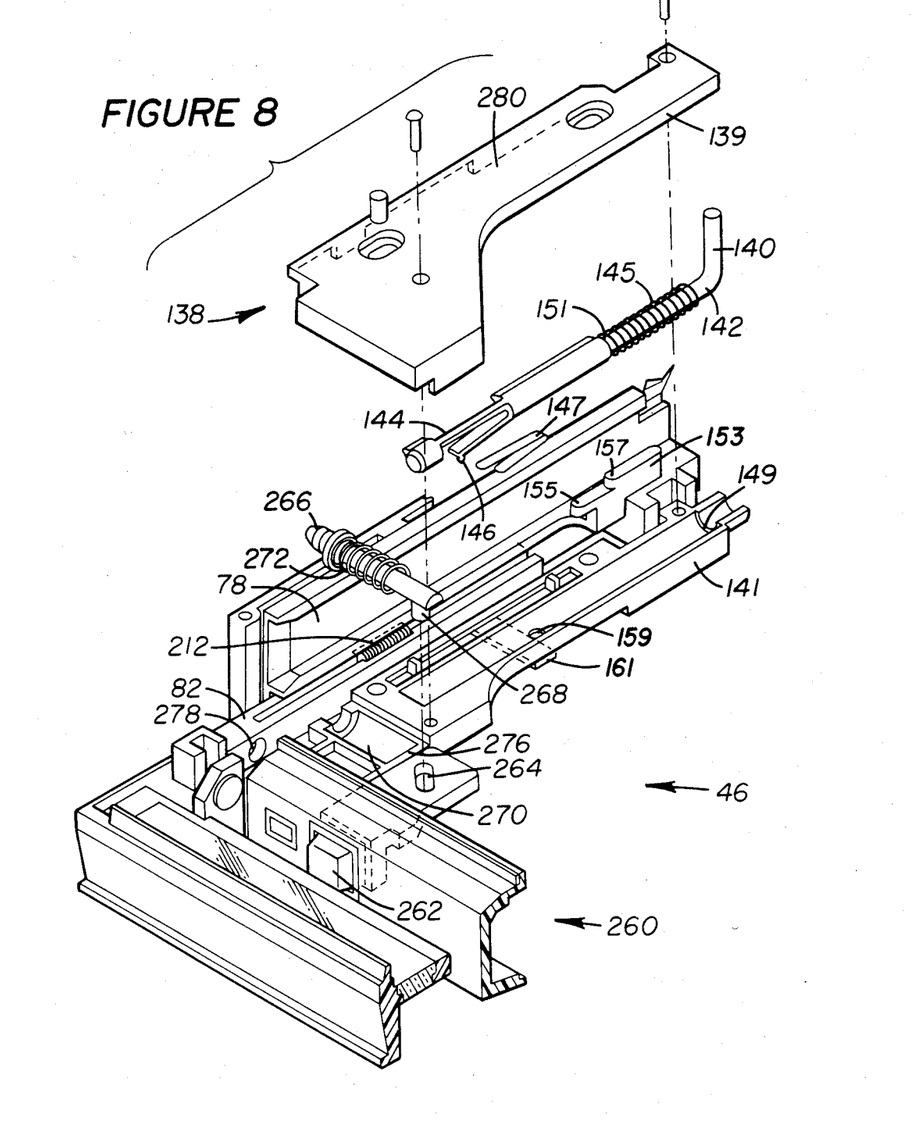
FIG. 8 is an exploded view taken through line 8—8 in FIG. 3.

It is to be noted further that the carriage mounting and positioning means 34 includes a spring means which includes leaf springs 200 and 202 (FIGS. 3 and 9) which are mounted in first rack 48 and which cause first rack 48 to be positively positioned with respect to the rest of the housing 54, and also springs 204 and 206 which are located at the ends of channels 64 and 78 and which put a positive downward pressure on the cartridge 27 when it is fully received in said channels. Additionally the spring means includes elastomeric pads 208 and 210 mounted on door 18, which bear down on the upper surface of the cartridge 27 after the door 18 is closed. Finally, the spring means includes a spring 212 (FIG. 8) which is located in longitudinal arm 82 and besides performing other functions as will be described hereinbelow, causes the arm 82 to be spring-biased by a downward sloping cam surface 280 on ejector housing 139 with respect to the rest of the housing 139 and thus helps to precisely position the channel 78.

The cam arrangement 30 includes a yoke 166 which is pivotally mounted to a base 168 by a pivot pin 170. A spring 172 is mounted about pin 170 and urges yoke 166 downwardly towards floor 16. Base 168 is mounted on the back sidewall 174 of housing 12. Yoke 166 includes first and second arms 176 and 178 which extend toward the door 18 about the carriage 24. Extending inwardly from each arm are first and second roller 180 and 182. These rollers lift the head 26 upwardly as will be described more fully hereinbelow. First arm 176 includes a cammed lower surface 184 which is engaged by upstanding tab 152 as second rack 50 moves rearwardly. This upstanding tab 152 urges the first leg 176 and thus the yoke 166 upwardly.

A post 186 is upstanding from floor 16 adjacent the end of first arm 176. Mounted to post 186 is a hydraulic dashpot 188. It is to be understood that other types of dashpots or dampers can be used in substitution for hydraulic dashpot 188. The upper end of hydraulic dashpot 188 is secured to the end of first arm 176. When door 18 is closed and arm 50 is retracted towards the door 18, the yoke 166 is allowed to settle in a damped manner downwardly and thus the head 26 is allowed to settle in a damped manner downwardly by the dashpot 188.

Figure 6:
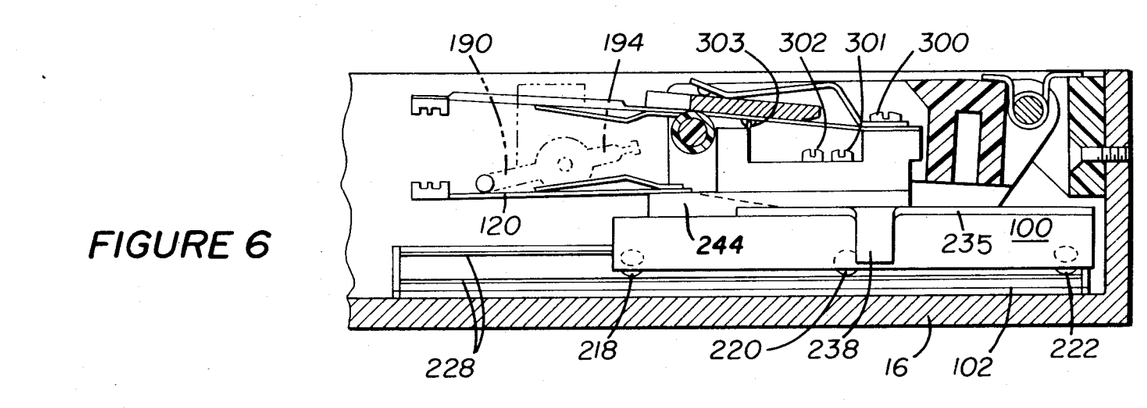
FIG. 6 is a cross-sectional view taken through line 6—6 in FIG. 3.

Also mounted to upstanding post 186 is an arm 190. Arm 190 is pivotable about pin 192. Arm 190 is disposed above and can engage the lower flexure 120 (described hereinbelow) to which head 28 is secured (FIG. 6). Extending rearwardly from arm 190 is a second shorter arm 194. A spring 196 is secured to arm 194 and to the upstanding post 186. Spring 196 causes the arm 190 to be urged downwardly to hold the flexure 120 and head 28 down in a position which is below its normal contacting position with disc 25. Arm 194 includes a tab 198 which is located beneath the end of the first arm 176 of yoke 166. When the second rack 50 and the upstanding tab 152 is disengaged from the cam surface 184 as the door 18 is closed, yoke 166 is urged downwardly by spring 172, and the first arm 176 of the yoke is urged downwardly onto tab 198. It is to be remembered, however, that this downward motion of the yoke 166 is damped by dashpot 188. As this occurs the end of the first arm 176 of the yoke 166 urges tab 198 downwardly against spring 196 and thus urges arm 190 upwardly in a damped manner so as to relieve the pressure on flexure 120 so that head 28 progresses upwardly in a damped manner into engagement with a disc.

The carriage 24, as can be seen in FIGS. 2, 3, 6, 7A and 7B, includes a base 100 which is slidably mounted on track 102 which is secured to the floor 16 of housing 12. A plurality of roller bearings such as roller bearings 214, 216, 218, 220, 222 are mounted on the base 100. Roller bearing 224 is spring-biased by an elastomeric material 226 or a metallic flexural spring. These roller bearings ride on hardened rods 228 and 230 which are mounted in the track 102. It is to be understood that the spring loading of roller 224 causes all of the rollers to receive evenly the load placed by the base and the rest of the carriage upon the track 102, and also to be understood that as the rollers are cylindrical and as the rods that they ride on substantially describe a line, the path described as the rollers move over the rod is substantially a line. Thus contaminates tend to be urged to one or the other side of the rod rather than being crushed underneath the rollers, so that such contamination does not interfere with the orderly and accurate positioning of the carriage and thus the heads with respect to the disc.

The carriage further includes an anchor plate 234. To anchor plate 234 at position 236 is secured the back end of the band 44. Anchor plate 234 also includes a downwardly disposed tab 238 (FIGS. 2, 6) which comes into contact with the bent end 160 of arm 154 when the carriage is in the full forward position of FIG. 7B. This downwardly dependent tab 238 is urged rearwardly by the arm 154 so that the carriage is urged rearwardly. It is to be understood that the anchor plate 234 is comprised of, in a preferred embodiment, carbon steel such that the coefficient of expansion of the anchor plate is relatively low compared to the rest of the materials which form the carriage which include aluminum and brass, and the rest of the materials which are used to fabricate the disc drive 10 which are essentially aluminum for the housing 12 and plastic for many of the internal parts.

The band 44 is wrapped about spindle 42. The band 44 is secured to a U-shaped spring 240 which U-shaped spring is secured to a forward position 242 of base 100. In a preferred embodiment, the U-shaped spring 240 and the band 44 in a preferred embodiment are comprised of a stainless steel material so that their coefficient of expansion is relatively low in comparison to the rest of the disc drive 10. Further, as U-shaped spring 240 is located adjacent disc 25, it heats at about the same rate as does the disc. The base 100 further includes a first platform 244 to which the second head 28 is secured as will be described below, and a second platform 246 which includes an upstanding post 248 (FIG. 7B) to which the upper head 26 is mounted. A first flexible member 106 is secured to the top of upstanding post 248. The flexible member 106 is secured at its opposite end to a platform 108. A spring 110 is also secured to post 104 above flexible member 106 and is used to urge the platform 108 downwardly. Platform 246 includes a forwardly positioned upstanding post 250 which is used to provide a stop for the downward movement of the platform 108.

A first flexure 114 is secured to platform 108 at the opposite end to the flexible member 106. At the end of flexure 114 the first or upper head 26 is secured. The flexure 114 is generally biased downwardly toward the base 100 and a stop 116 is secured to the platform 108 inboard of the flexure 114 to limit the motion of the flexure 114 toward the base. Extending from the platform 108 on either side thereof are roller followers 118 and 119 (FIGS. 2, 3) which ride on the inwardly directed rollers 180 and 182 of the yoke 166.

Secured to the first platform 244 substantially immediately below the first flexure 144 is a second flexure 120 to which is mounted a second or lower head 28. The second flexure 120 is biased upwardly. Mounted to the second platform 246 inboard of the second flexure 120 is another stop 122 which limits the motion of the flexure 120 and the head 28 toward the head 26 which is located immediately thereabove. It is to be understood that when a cartridge with a disc is inserted into the disc drive arrangement 10 that the head 26 can be placed adjacent to the upper surface thereof and the head 28 adjacent to the lower surface thereof so that reading and recording can be accomplished on both sides of the disc.

It is to be understood that, in a preferred embodiment, the first platform is comprised of brass, and the second and third platforms of aluminum.

The disc drive arrangement 10 and in particular the carriage has been carefully constructed so that thermal expansions are balanced. As previously stated, thermal expansion can cause a misalignment of the heads with respect to the tracks on the disc. Such thermal expansion is compensated for by this arrangement 10. From a first reference point including the spindle 76 onto which the cartridge 27 and the hub of the disc is mounted, the housing 12 which is essentially comprised of aluminum expands rearwardly. The hard disc 25 which is also essentially comprised of aluminum expands outwardly, thus both the disc 25 and the housing 12 expand rearwardly from the spindle 76. As the housing 12 expands more than the disc, due to the larger distance between the center of the spindle 76 to the center of the stepper motor spindle 42 and the additional thermal expansion of both the band 44 in the rearward direction and the increase in diameter of the spindle 42, it is necessary to allow the carriage to expand toward the disc to compensate for this expansion. Essentially the carriage expands forward from the reference position 236 where the flexible member 44 is mounted to the anchor plate 234 and compensates for the rearwardly expansion of the housing so that heads remain closely aligned with respect to the tracks on the hard disc. Furthermore the relative thermal expansion of the top head 26 with respect to the bottom head 28 is compensated for by an appropriate choice of materials and securing points 300, 302 and 303. In a preferred embodiment, the second platform is secured to the first platform at points 300 and 302. The third platform is secured to the flexible member 106 made of phosphor bronze at point 303. The entire assembly is secured to the carriage 24 at points 304 and 300. The location of these points has been chosen to have no relative expansion between the bottom head 28 and the top head 26.

The ejector means 46 is mounted in a platform 138 which has upper and lower portions 139 and 141. The platform 138 serves as a mount for the elongated member 82. The ejector means 46 includes an ejector pin 140 which is part of an elongated rod 142 which has a bifurcated distal end 144 which is spring-loaded by spring 147 and which has a button 146 affixed to the lower element of the bifurcated end 144. The rod 142 fits in a bore of platform 138 and button 146 can drop through an aperture 159 which is substantially perpendicular to the bore through which the rod is disposed. When a cartridge is inserted into the disc drive arrangement 10 the ejector pin 140 is urged rearwardly causing the button 146 to drop into aperture 159. A tab 161 extending from the longitudinal member 82 moves forward when door 18 is opened and trips button 146 releasing it from aperture 159. The spring 145 then urges the ejector pin 140 toward the platform 138 causing the cartridge to be urged out of the disc drive arrangement 10. It is to be understood that spring 145 is confined between shoulders 149 and 151.

Mounted on the cartridge mounting and positioning means 36 adjacent stepper motor 40 and substantially upstanding from the means 36 is an elongated member 153 which penetrates an aperture (not shown) in the cartridge 27 to actuate the door-opening mechanism thereof. This elongated member 153 includes a first lower step and a second upper step 155 and 157 respectively. If the cartridge is inserted incorrectly so that the elongated member 154 does not go into the aperture, the cartridge is kept from being inserted fully into the disc drive arrangement 10, and no part of the cartridge comes in contact with and potentially damage the heads 26 and 28.

The platform 138 further mounts the door release and opening mechanism 260. This mechanism includes door-opening button 262 which has an elongated slot 264 set at approximately a 45 degree angle with respect to the platform 138. The mechanism 260 further includes a rod 266 which has a downwardly dependent pin 268 which is inserted into slot 264. The rod is disposed substantially parallel to the door 18 and rests in a bore 270 defined by the platform 138. A spring 272 is mounted about the rod 266 and is confined between shoulder 274 of the rod and shoulder 276 of the bore. The tip of the rod 266 can be received in a bore 278 which is defined in the elongated member 82. The elongated member 82 is further biased toward door 18 by previously identified spring 212 which is mounted in elongated member 82 and is compressed by a downwardly sloping cam surface 280 from the portion 139 of the platform 138. As the door is closed, the spring 212 is compressed, and the tip of rod 266 is inserted into aperture 278 fixing the door in the closed position with respect to the rest of the housing 12. When the button 262 is pushed inwardly the slot 264 is translated inwardly so that the pin 268 is urged outwardly with the rest of the rod 266 by the spring 272, releasing the end of rod 266 from the hole 278 and allowing the spring 216 to urge the member 82 forward and pop the door open. As the door is further opened by hand, the member 152 causes the ejector mechanism to pop the cartridge out of the housing.

INDUSTRIAL APPLICABILITY

The operation of the above invention is as follows. Initially the door 18 of the disc drive arrangement 10 is opened with the simultaneous urging of the carriage 24 rearwardly due to the engagement of the second arm 154 and in particular the bent end 160 with the tab 238 of the carriage, and the upwardly and downward camming of the heads 26 and 28 respectively. When the door is fully down, the carriage 24 is in its fully rearwardly position (FIG. 7A) and the upper and lower heads are in their fully opened position so that the insertion of the cartridge into the appropriate channels of the cartridge mounting and positioning means 34, 36 will not damage the heads. When the cartridge has been slid past elongated member 53 the doors of the cartridge open. As the cartridge is fully inserted into the disc drive arrangement 10, the cartridge pushes the ejector pin 140 rearwardly locking the button 146 in aperture 150. The heads 26, 28 enter the cartridge through doors (not shown) in the upper and lower surfaces of the cartridge. Next the door is closed causing the upstanding tab 152 on the second rack 50 to be moved towards the door, allowing spring 172 to cause the yoke 166 to move towards the floor 16, and with the action of the dashpot 188 allowing the heads 26, 28, in a damped manner, to position themselves adjacent to the upper and lower surfaces of the disc. Just prior to this occurring, the cartridge is lowered by the cartridge mounting and positioning means 34 and 36 onto the spindle 76. At this point the pins inserted into the Z-slots are at approximately the spike thereof and the cartridge hub (not shown) is forced against the spindle flange 77. As the door is finally closed the pins become removed from the spikes and progress along the horizontal portion such as portion 74 of the Z-shaped slots. When this occurs, the cartridge housing is lifted somewhat relative to the disc which is firmly engaged with the spindle 76 so that the disc can now spin freely with respect to the cartridge as the spindle turns. The stepper motor can then drive the carriage 24 forward to the appropriate track on the disc. It is to be understood that due to the above camming action and due to the cartridge design which allows the heads to enter the upper and lower surfaces thereof (see U.S. Pat. No. 4,503,474 covering the cartridge and assigned to SyQuest), the heads are not damaged by the insertion of the cartridge into the disc drive.

To remove the cartridge under either a power-on or a power failure condition, the button 262 is pushed causing the door 18 to pop open. From that position the door can be fully extended by the hand of the operator. As this is occurring the member 152 trips the ejector mechanism 46 after the carriage 24 has been moved to its rearward position by second rack 50 so that the ejector pin 140 urges the cartridge out of the disc drive arrangement 10. Thus it is to be understood that even if the power is off, the cartridge and disc can be easily and conveniently removed from the disc drive arrangement without damage to the heads or the information stored on the disc.

Further the spring means allows the cartridge to be positively positioned with respect to the channels so that the disc and the heads are properly aligned. Also, the present invention includes the advantage that the housing is thermally balanced so that as the various parts expand, this expansion is compensated for and thus the heads stay in the proper track of the disc.

Other aspects, objects and advantages of the invention can be obtained from a study of the drawings, the disclosure and the appended claims.

We claim:

1. A disc drive arrangement for accessing information from and recording information onto a disc retained in a cartridge, which cartridge is insertable into the disc drive, comprising:
   at least one head;
   a carriage means for mounting and transporting said head;
   motor means for positioning at least a portion of said carriage means relative to said housing;
   wherein said carriage means includes:
   a track secured to said housing;
   a base upon which said head is mounted;
   and roller means for interconnecting said base to said track;
   said roller means includes at least first and second pairs of cylindrical rollers mounted on said base;
   wherein said cylindrical rollers ride on a plurality of rods mounted on said track;
   wherein said first pair of cylindrical rollers includes first and second cylindrical rollers mounted side by side;
   wherein said second pair of cylindrical roller is located adjacent the first pair of cylindrical rollers and said second pair of cylindrical rollers includes third and fourth cylindrical rollers mounted side by side;
   wherein said first and third cylindrical rollers are mounted side by side, and said second and fourth cylindrical rollers are mounted side by side, with either the first and fourth rollers, or the second and third cylindrical rollers being disposed at an angle with respect to the other of the first and fourth rollers, or the second and third cylindrical rollers and with respect to said track in order to stabilize the base relative to the track; and
   wherein said cylindrical rollers describe substantially a line as said cylindrical rollers roll on said rods so that any contaminants accumulated on said rods are not crushed between said cylindrical rollers and said rods but are urged to one or the other side of said rods so that such contaminants do not interfere with the accurate positioning of said base and head mounted thereon.

2. The disc drive arrangement of claim 1 including means for resiliently mounting at least one of said cylindrical rollers so that all the rollers are substantially equally loaded.

* * * * *

UNITED STATES PATENT AND TRADEMARK OFFICE
CERTIFICATE OF CORRECTION

PATENT NO. : 4,722,012

DATED : January 26, 1988

INVENTOR(S) : Toldi, et al.

It is certified that error appears in the above-identified patent and that said Letters Patent is hereby corrected as shown below:

Column 1, line 20: "many fold" should be --manyfold--

Column 1, line 26: the word "a" should be inserted between the words "is" and "power"

Column 3, line 7: the word "line" should be deleted

Column 3, line 13: "through line 7" should be "through line 7-7"

Column 3, line 24: "application" should be "patent"

Signed and Sealed this

Twenty-eighth Day of February, 1989

Attest:

DONALD J. QUIGG

*Attesting Officer*   *Commissioner of Patents and Trademarks*